(12) United States Patent
Choi et al.

(10) Patent No.: US 11,534,715 B2
(45) Date of Patent: Dec. 27, 2022

(54) DUST COVER FOR AUTOMOTIVE LAMPS WITH EXCELLENT MOISTURE CONTROL PERFORMANCE

(71) Applicant: DesiKhan Co., Ltd., Daejeon (KR)

(72) Inventors: Nak Cheon Choi, Sejong-si (KR); Eun Young Park, Daejeon (KR); Jong Hyup Kim, Seoul (KR)

(73) Assignee: DesiKhan Co., Ltd., Daejeon (KR)

( * ) Notice: Subject to any disclaimer, the term of this patent is extended or adjusted under 35 U.S.C. 154(b) by 175 days.

(21) Appl. No.: 17/012,579

(22) Filed: Sep. 4, 2020

(65) Prior Publication Data

US 2022/0001327 A1 Jan. 6, 2022

(30) Foreign Application Priority Data

Jul. 6, 2020 (KR) ........................ 10-2020-0083061

(51) Int. Cl.
  *B01D 53/26* (2006.01)
  *F21S 45/10* (2018.01)
  *F21S 45/00* (2018.01)
  *B01D 53/28* (2006.01)
  *F21S 45/50* (2018.01)

(52) U.S. Cl.
  CPC .......... *B01D 53/261* (2013.01); *B01D 53/28* (2013.01); *F21S 45/00* (2018.01); *F21S 45/10* (2018.01); *F21S 45/50* (2018.01); *B01D 2253/1124* (2013.01); *B01D 2253/202* (2013.01); *B01D 2253/25* (2013.01)

(58) Field of Classification Search
  CPC .................. B01D 53/261; B01D 53/28; B01D 2253/1124; B01D 2253/202; B01D 2253/25; F21S 45/00; F21S 45/10; F21S 45/50; F21W 2107/10
  See application file for complete search history.

(56) References Cited

U.S. PATENT DOCUMENTS

| 2008/0012172 A1* | 1/2008 | Merical ............... B65D 81/266 264/254 |
| 2018/0272311 A1* | 9/2018 | Harada ............. B01J 20/28004 |
| 2018/0353931 A1 | 12/2018 | Hyung et al. |

FOREIGN PATENT DOCUMENTS

| CN | 110160004 A | 8/2019 |
| CN | 110410751 A | 11/2019 |
| CN | 110486691 A | 11/2019 |
| JP | S62197129 A | 8/1987 |

(Continued)

OTHER PUBLICATIONS

Extended European Search Report for corresponding European Patent Application No. 20193122.7, dated Feb. 11, 2021.

(Continued)

*Primary Examiner* — In Suk C Bullock
*Assistant Examiner* — Jason Y Chong
(74) *Attorney, Agent, or Firm* — K&L Gates LLP

(57) ABSTRACT

Provided is a dust cover having excellent moisture control performance which is applied to a car lamp. The dust cover having excellent moisture control performance has excellent lamp humidity adjustment ability, and thus, efficiently removes moisture present inside to prevent moisture dew condensation due to a rapid temperature difference beforehand, and furthermore, maintains humidity inside the lamp low to prevent corrosion or malfunction of mounted components.

9 Claims, 2 Drawing Sheets

(56) References Cited

FOREIGN PATENT DOCUMENTS

| | | | |
|---|---|---|---|
| JP | 2003340233 | A | 12/2003 |
| JP | 2005218910 | A | 8/2005 |
| JP | 2003-113248 | A | 1/2014 |
| KR | 101760304 | B1 | 7/2017 |
| KR | 10-1825698 | B1 | 2/2018 |
| KR | 101937971 | B1 | 1/2019 |
| KR | 10-2019-0132816 | A | 11/2019 |
| KR | 102058425 | B1 | 12/2019 |

OTHER PUBLICATIONS

Japanese Notice of Reasons for Refusal for corresponding Japanese Patent Application No. 2020-144015, dated Sep. 22, 2021.
Indian Office Action for corresponding Indian Patent Application No. 202124026438, dated Feb. 17, 2022.
Office Action of KR Patent Application No. 10-2020-0083061 (dated Sep. 14, 2020).

* cited by examiner

DUST COVER FOR AUTOMOTIVE LAMPS WITH EXCELLENT MOISTURE CONTROL PERFORMANCE

CROSS-REFERENCE TO RELATED APPLICATIONS

This application claims priority under 35 U.S.C. § 119 to Korean Patent Application No. 10-2020-0083061, filed on Jul. 6, 2020, in the Korean Intellectual Property Office, the disclosure of which is incorporated herein by reference in its entirety.

TECHNICAL FIELD

The following disclosure relates to a dust cover having excellent moisture control performance applied to a car lamp. More particularly, the following disclosure relates to a dust cover having excellent moisture control performance, which may maintain humidity inside a lamp at a low humidity for a long period of time while preventing dew condensation occurrence, due to an excellent moisture absorption force.

BACKGROUND

A car lamp is an important component which may improve a consumer's sensitivity in a design aspect in addition to having a general function of shedding light. While a differentiated high-level design is demanded by consumers, appearance of a light source such as an LED increases a design freedom degree and makes a lamp structure more complicated. Due to smaller internal space, various engineering challenges for performance satisfaction are presented.

During transportation or storage of cars, dew condensation occurs due to moisture introduced into a lamp such as a head lamp, a rear lamp, a fog lamp, and a daytime running light (DRL). This may cause damage to a mounted electronic device as well as deteriorated light distribution performance. Besides, consumer's complaints in the aesthetic aspect are increased and industrial loss due to lamp replacement following claims is high.

In a car lamp, in the case where a temperature difference between inside and outside parts is large in a high humidity environment such as in the rain, when a lamp lens temperature is lowered, moisture particles in the lamp condenses so that fine water drops are formed on the inner surface of the lens to induce fogging. A light scattering phenomenon resulting therefrom becomes a big obstacle to safe car driving.

In order to prevent the dew condensation from occurring inside the lamp, a moisture absorbent is used. A moisture absorbent has a pouch form and is mounted in a space in a dust cover provided for replacing a lamp bulb. Mounting is performed by squashing a pouch into the space and then fixing a bracket.

The moisture absorbent in the form of a pouch which is mounted in the dust cover should withstand vibration due to car driving. Since packaging may be damaged due to vibration, the bracket should be further engaged inconveniently for preventing the content in the packaging from being discharged outside.

The bracket is fixed while pressing the moisture absorbent in a folded pouch form, which causes a problem that the moisture absorbent releases absorbed moisture again due to the pressure.

In addition, in a process of applying the moisture absorbent in a pouch form to the dust cover, the moisture absorbent may be damaged in a process of erroneously engaging a bolt and a defect that the content is ejected outside may occur. In addition, since the process proceeds by hand, productivity may be lowered.

In addition, surfaces to which the moisture absorbent is exposed are different depending on an operator, a moisture absorption speed is different, performance implementation may be non-uniform, and thus, reliability of the product may be decreased.

RELATED ART DOCUMENTS

Korean Patent Registration Publication No. 10-1937971 (Jan. 7, 2019)

SUMMARY

A conventional moisture absorbent in a pouch form has problems in that it is not easily applied to a dust cover and has a limitation in moisture absorption performance, thereby having a limitation in a useful life.

An embodiment of the present invention is directed to providing a dust cover having an excellent moisture control function which has continuous moisture absorption performance for a long period of time and maintains low humidity inside a lamp so that fogging dew condensation does not occur inside.

Another embodiment of the present invention is directed to providing a dust cover having a moisture control function which is easily applied in a process, overcomes a limitation in moisture absorption performance to extend a useful life, and has excellent durability.

In one general aspect, a dust cover having excellent moisture control performance includes:

a housing (dust cover housing or dust cover body) having a housing space formed inside and one open end; and a moisture absorption unit including an air-permeable film and a moisture absorbent which is sealed with the air-permeable film and provided in the housing space, wherein the moisture absorption unit has a moisture absorption rate of 130% or more and a release rate of 4% or less.

In an exemplary embodiment of the present invention, the air-permeable film may seal the one open end of the housing.

In an exemplary embodiment, the moisture absorption unit may further include: a moisture absorbent storage unit having one open end, wherein the moisture absorbent is housed in a moisture absorbent storage unit housing space of the moisture absorbent storage unit, and the air-permeable film seals the one open end of the moisture absorbent storage unit.

The moisture absorbent according to an exemplary embodiment of the present invention may be included at 80 vol % or less of the housing space.

The moisture absorption unit according to an exemplary embodiment of the present invention may have a moisture absorption speed of 2 to 6%/2 hours or more.

The moisture absorbent according to an exemplary embodiment of the present invention may include:

(A) at least one or two or more hygroscopic materials selected from the group consisting of magnesium chloride, calcium chloride, and sodium carbonate; and (B) a curable inorganic substance including at least one or more selected from the group consisting of magnesium oxide and calcium oxide.

The moisture absorbent according to an exemplary embodiment of the present invention may include (A) 10 to 50 wt % of the hygroscopic material and (B) 50 to 90 wt % of the curable inorganic substance.

The moisture absorbent according to an exemplary embodiment may further include a polymer wax.

The moisture absorbent according to an exemplary embodiment may further include an alkali metal phosphate salt.

In another general aspect, a car lamp includes: the dust cover having excellent moisture control performance.

In the car lamp according to an exemplary embodiment of the present invention, a humidity inside the lamp is maintained at 60% or less for 45 days or more under a condition of being left at 40° C. and 90% R.H.

Other features and aspects will be apparent from the following detailed description, the drawings, and the claims.

DETAILED DESCRIPTION OF MAIN ELEMENTS

Figure 1:
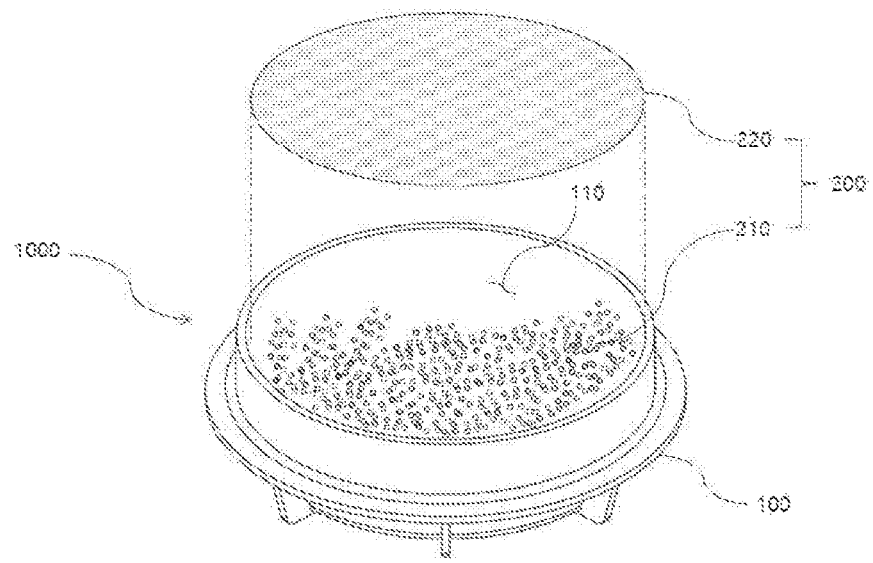
FIG. 1 is a schematic diagram of a dust cover having excellent moisture control performance according to an exemplary embodiment of the present invention.

1000: dust cover
100: housing
110: housing space
200: moisture absorption unit
210: moisture absorbent
220: air-permeable film
230: moisture absorbent storage unit
240: moisture absorbent storage unit housing space

DETAILED DESCRIPTION OF EMBODIMENTS

Hereinafter, the present invention will be described in more detail with reference to specific examples and exemplary embodiments including the accompanying drawings. However, the following specific examples or exemplary embodiments are only a reference for describing the present invention in detail, and the present invention is not limited thereto, and may be implemented in various forms.

In addition, unless otherwise defined, all technical terms and scientific terms have the same meanings as those commonly understood by a person skilled in the art to which the present invention pertains. The terms used herein are only for effectively describing a certain specific example, and are not intended to limit the present invention.

In addition, the singular form used in the specification and claims appended thereto may be intended to also include a plural form, unless otherwise indicated in the context.

In addition, unless particularly described to the contrary, "comprising" any elements will be understood to imply further inclusion of other elements rather than the exclusion of any other elements.

Conventionally, in order to absorb moisture inside a car lamp assembly, a product in which a moisture absorbent pouch is fixed to a groove inside a dust cover with a bracket, has been used.

Manufacture of the dust cover having the moisture absorbent pouch fixed thereto was performed by hand, and thus, productivity was decreased or a defect rate was increased.

In addition, in order to fix the moisture absorbent pouch, a step of fixing using an additional assembly such as a bracket should be further included, thereby increasing a production step and production costs. In addition, an increase in moisture re-release also occurs due to the bracket.

Thus, the present invention provides a dust cover having excellent moisture control performance, the dust cover including:

a housing having a housing space formed inside and one open end; and a moisture absorption unit including an air-permeable film and a moisture absorbent which is sealed with the air-permeable film and provided in the housing space, wherein the moisture absorption unit has a moisture absorption rate of 130% or more and a release rate of 4% or less.

Hereinafter, the present invention will be described in detail, referring to the drawings.

As shown in FIG. 1, a first embodiment of the present invention provides a dust cover 1000 having excellent moisture control performance including:

a housing 100 having a housing space 110 formed inside and one open end; and a moisture absorption unit 200 including an air-permeable film 220 and a moisture absorbent 210 which is sealed with the air-permeable film 220 and provided in the housing space 110, wherein the air-permeable film 220 seals the one open end.

The housing 100 may be circular or rectangular, but the shape or size is not limited.

The moisture absorbent 210 is included in the housing space 110 inside the housing 100, and is sealed with the air-permeable film 220 so that the moisture absorbent 210 is not discharged outside the housing 100.

A method of sealing with the air-permeable film 220 includes using heat fusion, high frequency, an adhesive, or the like, but the method is not particularly limited as long as it allows complete sealing.

The moisture absorbent 210 is not largely limited as to the shape such as powder, granule, pellet, tablet, or disk, but preferably, may have a powder shape. The moisture absorbent 210 may be included at 80 vol % or less of the housing space 110. The moisture absorbent 210 may be included preferably at 20 to 75 vol %, and more preferably at 30 to 70 vol %. Due to free space inside the housing 100, a mixture of the moisture absorbent 210 becomes flowable and uniform mixing is derived, which is more effective for improving moisture absorption performance. In addition, by the effect of further increasing a surface area of the moisture absorbent 210, efficient moisture absorption and content stability may be secured.

In addition, a moisture absorption area is relatively large as compared with the case of using the conventional moisture absorbent included in and fixed to a pouch, and also, there is more interior space due to moisture expansion than that of the conventional moisture absorbent pouch, and thus, damage due to moisture expansion may be prevented beforehand.

FIG. 1 is only an example of the idea of the present invention, and the shape or size thereof is not limited thereto.

Next, referring to FIG. 2, the second embodiment of the present invention will be described.

Figure 2:
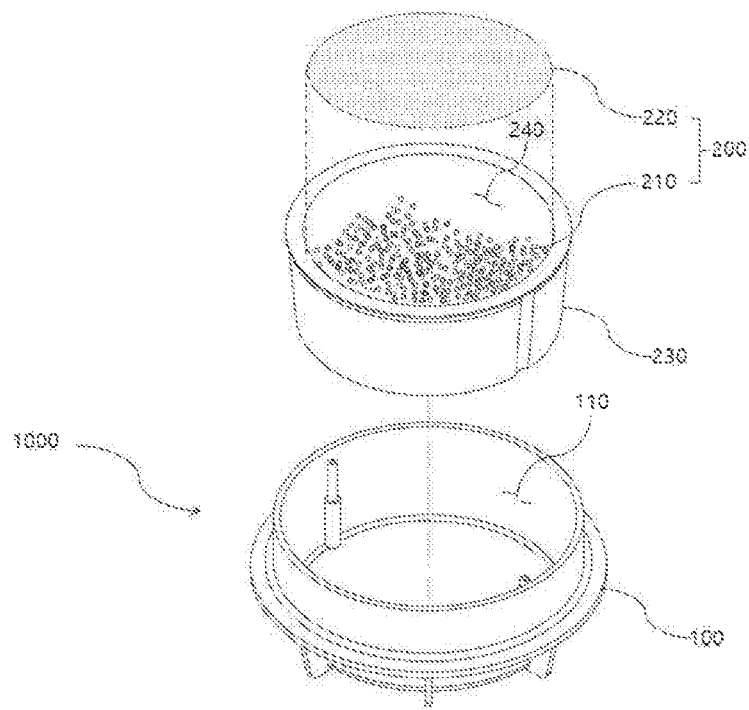
FIG. 2 is a schematic diagram of a dust cover having excellent moisture control performance according to another exemplary embodiment of the present invention.
Figure 3:
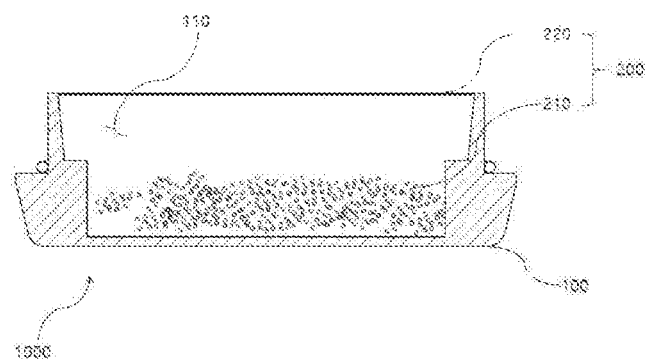
FIG. 3 is a cross-sectional diagram of the dust cover having excellent moisture control performance according to an exemplary embodiment of the present invention.
Figure 4:
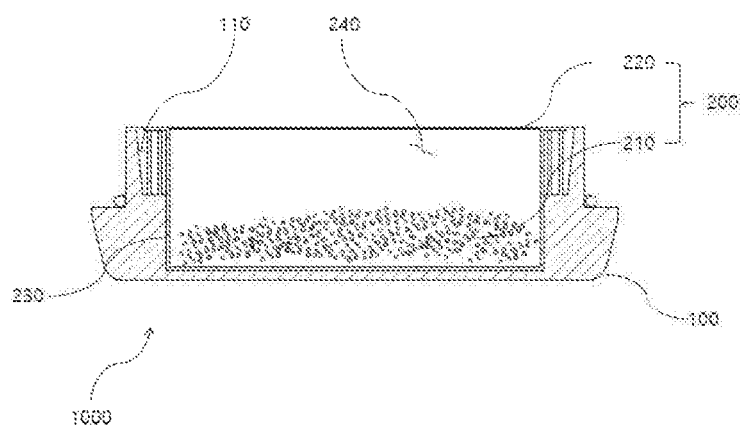
FIG. 4 is a cross-sectional diagram of the dust cover having excellent moisture control performance according to another exemplary embodiment of the present invention.

As shown in FIG. 2, the second embodiment of the present invention provides a dust cover 1000 having excellent moisture control performance including:

a housing 100 having a housing space 110 formed inside and one open end; and a moisture absorption unit 200 including an air-permeable film 220 and a moisture absorbent 210 which is sealed with the air-permeable film 220 and provided in the housing space, wherein the moisture absorption unit 200 further includes a moisture absorbent storage unit 230 having one open end, the moisture absorbent 210 is housed in a moisture absorbent storage unit housing space 240 of the moisture absorbent storage unit 230, and the air-permeable film 220 seals the one open end of the moisture absorbent storage unit 230, is provided.

The housing 100 may be circular or rectangular, but the shape or size is not limited.

In addition, the moisture absorbent storage unit 230 may be circular or rectangular, but the shape or size is not limited.

The moisture absorbent storage unit 230 is separately provided, the moisture absorbent 210 is included in the moisture absorbent storage unit 230, and the moisture absorbent 210 may be sealed with the air-permeable film 220 so that the moisture absorbent 210 is not discharge outside the moisture absorbent storage unit 230.

A method of sealing with the air-permeable film 220 includes using heat fusion, high frequency, an adhesive, or the like, but the method is not particularly limited as long as it allows complete sealing.

The moisture absorbent 210 is a powdery moisture absorbent, and the moisture absorbent 210 may be included at 80 vol % or less, and preferably 20 to 75 vol % of the moisture absorbent storage unit housing space 240. More preferably, the moisture absorbent may be included at 30 to 70 vol %, and due to free space inside the moisture absorbent storage unit 230, a mixture of the moisture absorbent 210 becomes flowable and uniform mixing is derived, which is more effective for improving moisture absorption performance. In addition, by the effect of further increasing a surface area of the moisture absorbent 210, efficient moisture absorption and content stability may be secured.

In addition, a moisture absorption area is relatively large as compared with the case of using the conventional moisture absorbent included in and fixed to a pouch, and also, there is more interior space due to moisture expansion than that of the conventional moisture absorbent pouch, and thus, damage due to moisture expansion may be prevented beforehand.

In addition, the moisture absorbent storage unit 230 is combined with the storage unit 110 of the housing 100.

The combination method is not limited. However, the moisture absorbent storage unit 230 combined with the housing space 110 of the housing 100 is detachable.

Since the moisture absorbent storage unit 230 is detachable from the housing space 110 of the housing 100, it is easy to replace the moisture absorbent storage unit 230 at end of moisture absorption life.

FIG. 2 is only an example of the idea of the present invention, and the shape or size thereof is not limited thereto.

Hereinafter, each constituent of the moisture absorption unit of the present invention will be described in more detail.

The moisture absorbent may be prepared by using a hygroscopic material such as magnesium chloride and a curable inorganic substance such as magnesium oxide as a main component and further including a polymer additive.

The constitution of the moisture absorbent will be described in more detail later.

The moisture absorption unit of the present invention may provide a dust cover having excellent moisture control performance of a moisture absorption rate of 130% or more and a release rate of 4% or less by a combination of the moisture absorbent and the air-permeable film, and within the range satisfying both the moisture absorption rate and the release rate, long-term use stability may be achieved.

The moisture absorption rate is a value obtained by measuring a moisture absorption rate after exposing a specimen to a temperature of 50±2° C. and a relative humidity of 95±5% for seven days using a thermohygrostat, and performing calculation by the following Equation 1:

$$\text{Moisture absorption rate} = \frac{\text{Final weight after a certain period of exposure} - \text{Initial weight}}{\text{Initial weight}} \times 100 \qquad [\text{Equation 1}]$$

In addition, the release rate is a value obtained by measuring a release rate when a specimen is exposed to a constant temperature and humidity condition of 23° C. and a relative humidity of 50% for 48 hours and then allowing the specimen to stand in an oven at 70° C. for 2 hours and performing calculation by the following Equation 2:

$$\text{Release rate} = \frac{\text{Initial weight} - \text{Weight after drying}}{\text{Initial weight}} \times 100 \qquad [\text{Equation 2}]$$

When applied to a car lamp, a humidity inside the car lamp may be maintained at 60% or less for 45 days or more, preferably 60 days or more under a condition of being left at 40° C. and 90% R.H.

The condition of being left means that the lamp assembly is allowed to stand under the temperature and humidity condition.

A test under the condition is an accelerated life test carried out under an acceleration condition, and in the real field, the moisture absorption effect may be maintained for a long period of time such as 6 months or more, preferably 1 year or more, and more preferably 2 years or more, as compared with a conventional product, accordingly. In addition, it is easier to replace the dust cover than the conventional dust cover using a moisture absorbent pouch.

The moisture absorption rate is an ability to absorb moisture, and the higher the moisture absorption rate is, the lower the humidity inside the lamp is maintained for a long period of time.

In particular, the moisture absorption rate is very effective in terms of rapidly removing moisture even in a rapidly changing external environment, as an example, a situation where a temperature is lowered or a humidity is increased.

Thus, occurrence of dew condensation inside the lamp may be prevented.

The moisture absorption rate is obtained by measuring a moisture absorption rate after exposing a specimen to a temperature of 50±2° C. and a relative humidity of 95±5% for seven days using a thermohygrostat, and performing calculation by the following Equation 1:

$$\text{Moisture absorption rate} = \frac{\text{Final weight after a certain period of exposure} - \text{Initial weight}}{\text{Initial weight}} \times 100 \quad \text{[Equation 1]}$$

The dust cover having excellent moisture control performance may have a moisture absorption rate of 130% or more, preferably 140 to 250%, and more preferably 150 to 200%. The moisture absorption rate is increased by 25% or more in terms of a moisture absorption effect as compared with the moisture absorption rate of the dust cover in a pouch form.

Due to the moisture absorption pattern of the dust cover having excellent moisture control performance, excessive moisture absorption is avoided and an efficient moisture absorption function is imparted inside the lamp.

In addition, the reaction of the content by moisture is optimized, thereby implementing a higher level of control performance of the humidity inside the lamp, due to some reasons such as production of a reaction cured body and formation of pores which may adsorb moisture particles in the internal structure of the content, though the exact reasons have not been confirmed.

In addition, the release rate is represented as a ratio of a content of moisture which is absorbed by the moisture absorbent and released again upon drying, and after moisture is absorbed for 48 hours under a constant temperature and humidity condition at 23° C. and a relative humidity of 50%, and drying is performed in an oven at 70° C. for 2 hours, a moisture absorption rate is measured at each drying temperature. After the initial moisture absorption proceeds and then drying is performed, each of an initial weight and a weight after drying is measured, and the release rate is calculated by the following Equation 2:

$$\text{Release rate} = \frac{\text{Initial weight} - \text{Weight after drying}}{\text{Initial weight}} \times 100 \quad \text{[Equation 2]}$$

The moisture absorption unit of the present invention may have a release rate of 4% or less, preferably 3% or less. The release rate may be more preferably 0.05 to 3%, still more preferably 0.001 to 2%.

As the release rate is lowered, an increase of a humidity inside the lamp due to release of absorbed moisture is prevented, and furthermore, performance degradation of an electronic device due to moisture particles inside a lamp may be minimized, which is thus effective for securing durability of a lamp assembly. Moreover, since no released moisture particles accumulate on a lens surface, dew condensation occurrence may be significantly decreased.

The dust cover having excellent moisture control performance according to an exemplary embodiment of the present invention may have a moisture absorption speed of 2 to 6%/2 hours or more, preferably 3 to 5%.

The moisture absorption speed is measured after exposing a specimen to a temperature of 50±2° C. and a relative humidity of 95±5% for 2 hours using a thermohygrostat, and calculated by the following Equation 3:

$$\text{Moisture absorption speed (\%/2 hr)} = \frac{(\text{Final weight after exposure for 2 hours} - \text{Initial weight})}{\text{Initial weight}} \times 100 \quad \text{[Equation 3]}$$

As the moisture absorption speed is increased, when a moisture content in a lamp is increased instantaneously, the moisture content is absorbed at a rapid speed to rapidly lower a humidity inside the lamp, thereby increasing an effect of preventing dew condensation occurrence.

The effects described above are those resulting from the configuration of the moisture absorption unit including the moisture absorbent and the air-permeable film.

Hereinafter, the air-permeable film will be described in detail.

The air-permeable film according to an exemplary embodiment of the present invention may have a moisture permeability of 100 to 1,000 g/m$^2$/h and a water pressure resistance of 1 to 30 cm H$_2$O/min, preferably a moisture permeability of 200 to 900 g/m$^2$/h and a water pressure resistance of 5 to 25 cm H$_2$O/min, and more preferably a moisture permeability of 300 to 800 g/m$^2$/h and a water pressure resistance of 10 to 20 cm H$_2$O/min, but is not limited thereto.

The moisture permeability is a numerical value measured in accordance with KS K 0594, and the water pressure resistance is a numerical value measured in accordance with ISO 811-1981.

The moisture permeability means that water vapor in the air moves to the inside of the dust cover having excellent moisture control performance, and the value may be varied depending on the moisture permeability of the air-permeable film. Within the range where the moisture permeability satisfies the above range, a moisture absorption speed may be controlled to increase a life of the dust cover having excellent moisture control performance.

The water pressure resistance means a pressure at which water or a liquid may penetrate the air-permeable film. When the adsorbent powder adsorbs moisture excessively, liquefaction proceeds and the liquefied liquid may be released again to the outside of the dust cover having excellent moisture control performance, and within the range where the water pressure resistance of the air-permeable film satisfies the above range, release of the liquid to the outside may be effectively prevented.

Thus, the air-permeable film satisfies both the moisture permeability and the water pressure resistance, thereby having a significant effect of preventing re-release of the liquid in the dust cover having excellent moisture control performance while effectively absorbing water vapor in a lamp.

In addition, the air-permeable film according to an exemplary embodiment of the present invention may have an air permeability of 500 to 700 ml/min and a tensile strength of 140 to 210 N/2.54 cm, preferably an air permeability of 450 to 650 ml/min and a tensile strength of 150 to 190 N/2.54 cm, and more preferably an air permeability of 400 to 600 ml/min and a tensile strength of 160 to 180 N/2.54 cm.

The tensile strength is a value satisfying both machine direction (MD) and cross direction (CD), and measured in accordance with ISO 1924-2.

In addition, the air permeability is a value measured in accordance with ISO 5636-3.

The air permeability represents an air permeation degree of the air-permeable film, and when the air-permeable film is within the air permeability range, more air permeates and water vapor included inside the air may be more adsorbed.

In addition, the air-permeable film has excellent durability within the range of the tensile strength and does not tear easily, and thus, may be used for a long period of time.

Though the material of the air-permeable film is not largely limited within the range of physical properties to be achieved by the present invention, the air-permeable film may be made of a polymer, cloth, paper, or the like, and preferably made of a polyolefin-based polymer, a polyester-based polymer, or the like.

The polyolefin-based polymer has high thermal resistance and durability, and in particular, has good water resistance to be highly resistant to moisture. In addition, the polyester-based polymer has good elasticity and also good water resistance.

Specific examples of the air-permeable film may include any one or more selected from a high density polyethylene (HDPE) non-woven fabric, a polypropylene (PP) non-woven fabric, a polyethylene (PE) non-woven fabric, a polyethylene terephthalate (PET) non-woven fabric, and the like, but is not necessarily limited thereto. As an example, the air-permeable film may be a high density polyethylene (HDPE) non-woven fabric, and a Tyvek non-woven fabric as a commercialized product, but is not limited thereto.

Tyvek is manufactured by processing high density polyethylene fiber with heat and pressure, and has excellent strength, and particularly, is permeated well by water vapor, but advantageously, is not permeated by a liquid such as water.

In another exemplary embodiment, it is preferred to use a laminated film which is laminated with a porous membrane or a coated air-permeable film in which a polymer coating solution is coated on the air-permeable film.

Since the porous membrane has uniform fine pores, moisture inside a car lamp may pass and be adsorbed through the pores.

The porous membrane may further include a perforated film. A "perforation" means that a hole is formed in a film thickness direction, and the perforated film means a membrane including perforations, which are described in detail in Korean Patent Registration Publication No. 10-2043286 issued to the present applicant.

Specifically, a diameter of the perforation of the perforated film may be 0.01 to 2.0 mm, and a perforation rate may be 1 to 50%. In addition, the perforated film has the number of perforations of 5 to 500 per a unit area ($cm^2$).

Though the material of the perforated film is not largely limited, the perforated film may be a polyolefin-based copolymer film, preferably a linear low density polyethylene film, a low density polyethylene film, a high density polyethylene film, and the like, and more preferably a linear low density polyethylene film, but is not limited thereto.

The perforated film of the above conditions has excellent mechanical physical properties, and efficient moisture absorption performance, and thus, it is easy to laminate the perforated film with the air-permeable film.

The laminated film may be manufactured by laminating the air-permeable film in the inner layer and the perforated film in the outer layer by a known method. Specifically, the laminated film may be manufactured by a thermal lamination method in which the two films are bonded by heat, but is not limited thereto.

In addition, the air-permeable film may further include a coating layer coated with a special coating solution containing a polymer. This is more effective in terms of controlling an aeration degree, and also improving adhesive strength and securing excellent thermal resistance.

The polymer coating may have a double membrane structure in which a coating layer including a synthetic latex is formed on the air-permeable film. When the structure of a packaging film has the double membrane structure, thermal resistance of an air-permeable packaging material is good, which is thus preferred. Here, the double membrane structure may be formed by a process of applying a coating solution including 2 to 10 wt % of an ethylene-vinyl acetate (EVA) material and 50 to 60 wt % of a solvent on the air-permeable film by a known method, and after applying the coating solution, a drying process by a known method may be performed, after applying the coating solution, if necessary.

The synthetic latex for forming the coating layer may correspond to an acryl latex pressure-sensitive adhesive and/or an acryl latex resin, and more specifically, it is not separately limited as long as an appropriate specification known to those skilled in the art is adopted. The EVA material for forming the coating layer preferably corresponds to a hot-melt adhesive including EVA, and again, an appropriate specification known to those skilled in the art may be adopted. Other materials as a component of the coating solution for forming the coating layer may be a curing agent, an inorganic filler, and/or an additive resin, examples of the curing agent may be at least one or more selected from the group consisting of amine-based curing agents, acid anhydride-based curing agents, phenol-based curing agents, and dicyandiamide-based curing agents, examples of the inorganic filler may be at least one or more selected from the group consisting of calcium carbonate, magnesium carbonate, talc, mica, kaolin, graphite, and silica, and examples of the additive resin may be at least one or more selected from the group consisting of terpene phenol resins, hydrogenated rosin, petroleum resins, xylene resins, and coumarone resins. Examples of a solvent as a component of the coating solution for forming the coating layer may be at least one or more selected from the group consisting of toluene, acetone, and methyl ethyl ketone.

A thickness of the coating layer may correspond to 3 µm to 20 µm, and more preferably 5 µm to 15 µm.

When the coating layer has the above thickness, strength and a moisture permeability effect are excellent.

The moisture absorbent according to an exemplary embodiment of the present invention will be described in detail.

The moisture absorbent may be powdery or granular, but is not limited thereto.

The moisture absorbent may be formed by including:

(A) at least one or two or more hygroscopic materials selected from the group consisting of magnesium chloride, calcium chloride, and sodium carbonate; and (B) a curable inorganic substance including at least one or more selected from the group consisting of magnesium oxide and calcium oxide.

In addition, the moisture absorbent according to an exemplary embodiment of the present invention may have a weight ratio of (A) the hygroscopic material to (B) the curable inorganic substance of 1:0.1 to 2, preferably 1:0.2 to 1.5, and more preferably 0.4 to 1.5.

The moisture absorbent including (A) the hygroscopic material and (B) the curable inorganic substance at the weight ratio may exhibit significant effects of having a low release rate while having an excellent moisture absorption effect.

In order to impart moisture absorbency, the moisture absorbent may include (A) the hygroscopic material including at least one or more selected from the group consisting of magnesium chloride, calcium chloride, and sodium carbonate, and further, may further include a hygroscopic material such as quicklime known in the art of the present invention. As (A) the hygroscopic material, it is more preferred to use magnesium chloride in terms of excellent moisture absorbency and a low release rate.

The magnesium chloride may improve a moisture absorption speed, moisture absorption persistence, and release resistance characteristics by a combination with other constituent components as well as implementing moisture absorption performance to absorb moisture inside a lamp.

According to an exemplary embodiment of the present invention, the magnesium chloride may be included at 10 to 50 wt %, preferably 20 to 45 wt %, and more preferably 25 to 40 wt %, based on a total weight of a moisture absorbent content. Within the range, an excellent moisture absorption rate is implemented, and a moisture absorption speed is optimized, which is thus effective in terms of efficiently suppressing deteriorated moisture absorption persistence due to excessive moisture absorption or re-release of absorbed moisture.

In addition, in order to prevent the moisture absorbent from being liquefied due to deliquescence by curing the moisture absorbent while absorbing moisture inside a lamp, (B) the curable inorganic substance including at least one or more selected from the group consisting of magnesium oxide and calcium oxide is included.

Moreover, the curable inorganic substance includes two kinds of magnesium oxides having different specific gravities, thereby having significant effects of optimizing the moisture absorption speed inside a lamp, implementing long-term continuous moisture absorption performance, and preventing re-lease of absorbed moisture at a rapidly raised temperature by outside air or car engine heat.

According to an exemplary embodiment of the present invention, the two kinds of magnesium oxides having different specific gravities may be included at 50 to 90 wt %, preferably 55 to 70 wt %, based on a total weight of a content of the moisture absorbent for a car lamp.

The two kinds of magnesium oxide having different specific gravities may be formed of high specific gravity magnesium oxide and low specific gravity magnesium oxide. Here, the high specific gravity and the low specific gravity are classified based on a relative value after measuring an apparent specific gravity. Specifically, the high specific gravity magnesium oxide may have a specific gravity of 3 to 8, preferably 4 to 7, and the low specific gravity magnesium oxide may have a specific gravity of 0.1 to 0.9, preferably 0.3 to 0.7.

The two kinds of magnesium oxides having different specific gravities may have a specific gravity ratio of the high specific gravity magnesium oxide to the low specific gravity magnesium oxide (low specific gravity/high specific gravity) of 0.01 to 0.3, specifically 0.05 to 0.2. Within the range, moisture absorption performance and release resistance may be further improved, which is thus more effective in terms of increasing life and suppressing expansion due to moisture absorption.

A mixing composition ratio between the high specific gravity magnesium oxide and the low specific gravity magnesium oxide having the specific gravity range described above in the two kinds of magnesium oxides having different specific gravities is not largely limited, but as a specific example, the mixing composition ratio may be 1:0.5 to 2, preferably 1:0.7 to 1.5, and more preferably 1:1 to 1.4. The range is more effective in terms of moisture absorption performance, release resistance, life increase, and suppression of expansion due to moisture absorption.

In the moisture absorbent according to an exemplary embodiment of the present invention, when the moisture absorbent is cured by moisture absorption, a water molecule participates in a crystal structure of magnesium oxide to be changed into a needle-shaped crystal structure, so that the moisture absorbent absorbs moisture, and also since moisture particles enter the space of the needle-shaped structure, moisture absorbency may be further improved.

According to an exemplary embodiment of the present invention, the high specific gravity magnesium oxide was adopted in the present invention since it was found that the high specific gravity magnesium oxide does not rapidly undergo a hydration reaction initially and is increasingly reacted over a long period of time with time, the low specific gravity magnesium oxide rapidly undergoes a hydration reaction initially to have excellent moisture absorbency, and the high specific gravity magnesium oxide and the low specific gravity magnesium oxide are combined with other components of the present invention, thereby obtaining a surprising effect of significantly improving initial moisture absorbency and a long-term moisture absorbency.

In addition, by using a hydration reaction rate of the high specific gravity magnesium oxide and the low specific gravity magnesium oxide, the moisture absorption rate may remain constant for a long period of time and a release resistance effect may be further improved, which is thus preferred. In addition, a volume expansion may be suppressed to prevent damage to packaging such as air-permeable packaging.

In another exemplary embodiment of the present invention, the moisture absorbent may be completed by including (A) a hygroscopic material; (B) a curable inorganic substance; and (C) a polymer wax.

The moisture absorbent of the present invention includes (A) the hygroscopic material; (B) the curable inorganic substance; and (C) the polymer wax, thereby having an excellent moisture absorption rate, minimizing re-release of absorbed moisture under a high temperature and low humidity environment, and also securing constant moisture absorbency.

By further including (C) the polymer wax, sponge-like soft properties may be imparted to the moisture absorbent after moisture absorption expansion of the moisture absorbent.

The polymer wax may further include at least one or more polymer waxes selected from the group consisting of a polyethylene wax, a polypropylene wax, a polyamide wax, a carnauba wax, a paraffin wax, and a polytetrafluoroethylene wax In the case of the polyethylene wax as the polymer wax, LH 1200 available from SFC and the like may be used as a commercialized example. When the environmental temperature of the moisture absorbent rises, such as the case where a temperature inside a car lamp rises, the polymer wax serves to be changed to a high-viscosity liquid phase to suppress release of absorbed moisture, and also, serves to adjust the moisture absorption rate of a product.

In an exemplary embodiment of the present invention, the moisture absorbent may include: (A) 10 wt % to 70 wt % of the hygroscopic material; (B) 10 wt % to 50 wt % of the curable inorganic substance; and (C) 5 wt % to 50 wt % of the polymer wax.

When the content of the moisture absorbent is as described above, a moisture absorption effect is excellent and a moisture re-release amount may be decreased.

The effect from the content will be described in detail.

Based on the moisture absorbent, (A) the hygroscopic material may be included at 10 wt % to 70 wt %, preferably 15 wt % to 65 wt %, and more preferably 20 wt % to 60 wt %, but is not limited thereto.

When the content of (A) the hygroscopic material is within the range, a moisture absorption effect of the moisture absorbent is excellent, and liquefaction of the prepared moisture absorbent due to excessive moisture absorption may be suppressed, thereby increasing stability of the product.

Based on the moisture absorbent, (B) the curable inorganic substance may be included at 10 wt % to 50 wt %, preferably 15 wt % to 45 wt %, and more preferably 10 wt % to 40 wt %, but is not limited thereto.

When the content of (B) the curable inorganic substance is within the range, separation of deliquescent moisture absorbent may be suppressed, while the moisture absorbent may maintain an excellent moisture absorption rate.

Based on the moisture absorbent, (C) the polymer wax may be included at 5 wt % to 40 wt %, preferably 10 wt % to 35 wt %, and more preferably 15 wt % to 30 wt %, but is not limited thereto.

When the content of (C) the polymer wax is within the range, the moisture absorbent may have an excellent moisture absorption rate and moisture absorption speed, so that the release rate of the moisture absorbed by the moisture absorbent may be suppressed.

The moisture absorbent of the present invention has stably excellent release resistance so that the absorbed moisture in a high temperature range of 50 to 80° C. where the car lamp is operated is not re-released, and thus, may be useful as a car lamp such as a car head lamp, a rear lamp or a fog light.

The moisture absorbent according to an exemplary embodiment of the present invention may further include an alkali metal phosphate salt.

The alkali metal phosphate salt may include an alkali metal ion selected from lithium, sodium, potassium, and the like.

Preferably, an alkali metal phosphate salt including a sodium metal ion may be included. Specifically, for example, the alkali metal phosphate salt may include any one or two or more selected from the group consisting of monosodium phosphate, disodium phosphate, trisodium phosphate, and the like, but is not necessarily limited thereto.

In the case of including the alkali metal phosphate salt, when the hygroscopic material, the curable inorganic substance, and the polymer wax are mixed together, expansion caused by moisture absorption may be efficiently suppressed, and humidity control performance under a high humidity condition is excellent, thereby securing long-term durability to implement a moisture absorption effect for a long period of time.

According to an exemplary embodiment of the present invention, the alkali metal phosphate salt may be included at 1 to 30 parts by weight, preferably 2 to 25 parts by weight, and more preferably 5 to 25 parts by weight, based on 100 parts by weight of the moisture absorbent. When the alkali metal phosphate salt is included in the range described above, an expansion rate upon moisture absorption may be further improved, which is thus more effective in terms of preventing moisture absorption product damage, content leakage, and the like.

According to an exemplary embodiment of the present invention, the moisture absorbent includes all of (A) the hygroscopic material, (B) the curable inorganic substance, (C) the polymer wax, and the alkali metal phosphate salt, thereby implementing excellent humidity control performance even in an environment requiring humidity adjustment, in particular, under an extremely humid condition, as well as an improved moisture absorption rate, and securing continuous moisture absorption performance. Furthermore, it is more effective in terms of securing stability so that occurrence of further damage due to expansion by moisture absorption is prevented.

According to an exemplary embodiment of the present invention, the moisture absorbent may further include a polymer additive. The polymer additive may be an anionic polymer having any one or two or more functional groups selected from a carboxyl group, a hydroxyl group, and the like. As a specific example, any one or two or more polymer additives selected from the group consisting of an alginic acid, an alginate, carrageenan, gelatin, a hyaluronic acid, a polyacrylic acid, a polyacrylate, a polymethacrylic acid, a polymethacrylate, starch, oxidized starch, cellulose, carboxylmethyl cellulose, and the like may be further included, but the present invention is not limited thereto. In addition, a coagulant such as A101 and NAP701 may be further included, but the present invention is not limited thereto.

According to an exemplary embodiment of the present invention, the polymer additive may be included at 0.1 to 10 parts by weight, based on 100 parts by weight of the moisture absorbent. Preferably, the polymer additive may be included at 0.01 to 5 parts by weight, but is not limited thereto. When the polymer additive is included at the content described above, stable solidification of an internal material after moisture absorption simultaneously with expansion suppression efficiency as well as moisture absorption performance to be desired may be further improved.

Another embodiment of the present invention may provide a car lamp structure including: the dust cover having excellent moisture control performance.

The dust cover having excellent moisture control performance is combined with one surface of the car lamp structure, thereby adsorbing moisture inside the car lamp structure more effectively than the conventional dust cover including a moisture absorbent pouch, and thus, the dust cover of the present invention is very economical and the effect is excellent.

According to an exemplary embodiment of the present invention, a relative humidity inside the car lamp structure may be maintained at 60% or less, preferably at 55% or less, and more preferably at 20% to 50%, when the car lamp structure is allowed to stand for 45 days under a condition of 40° C. and 90% R.H. According to another exemplary embodiment, the relative humidity inside the car lamp structure may be maintained at 60% or less, preferably 55% or less, and more preferably 20% to 50%, when the car lamp structure is allowed to stand for 50 days or more, preferably 60 days or more, and more preferably 75 days or more, under a condition of 40° C. and 90% R.H.

By combining the dust cover having excellent moisture control performance with one surface inside or outside the car lamp structure, a significant effect of maintaining the relative humidity inside the car lamp structure at 60% or less for 45 days may be exhibited. By using the dust cover having excellent moisture control performance, occurrence of dew condensation inside is significantly suppressed as compared with the case of using the conventional dust cover including a moisture absorbent pouch and also long-term use is possible.

In some embodiments, a car lamp assembly include a car lamp housing and at least one light source (e.g., light bulb or LED) enclosed in the car lamp housing. On one side of the car lamp assembly, a front panel is attached to the car lamp housing, and the front panel is transparent or translucent such that it can at least partially transmit light beams from the at least one light source to outside the car lamp assembly. The car lamp assembly may also include a reflector inside the housing for reflecting light beams from the at least one light source toward the front panel. The car lamp housing includes an opening for accessing an interior space of the car lamp housing. For example, the opening is formed at a location opposite the front panel. The opening can be used for accessing and replacing the at least one light source. The car lamp assembly further includes a dust cover which can be fitted to the opening and seal the opening, such that an airtight seal can be formed inside the interior space defined by the car lamp housing and the front panel.

The dust cover may be similar to the dust covers described elsewhere herein, such as the dust cover 1000. For example, the dust cover includes a dust cover body (or dust cover housing) which includes or defines a container having an open top. The container contains a moisture absorbent therein, and an air-permeable film is placed to cover the open top of the container such that the moisture absorbent inside the container wouldn't spill out of the container. The container may be integrally formed as part of the dust cover body as illustrated in FIG. 1. Alternatively, the container is separate from the dust cover body and is configured to engage with the dust cover body as illustrated in FIG. 2. The dust cover may not include additional structures to hold the moisture absorbent, such as grooves for receiving pouches, brackets for keeping pouches in such grooves.

The dust cover with the moisture absorbent is to be air-tightly engaged with or placed to air-tightly cover the opening of the car lamp assembly such that the air-permeable film faces the interior space of the car lamp assembly and such that moisture inside the car lamp assembly travel to the container through the air-permeable film and may be absorbed by the moisture absorbent. Later, the dust cover may be removed and replaced with a replacement dust cover when the moisture absorbent is saturated or expired. The replacement dust cover has a dust cover body that is to air-tightly fit the opening of the car lamp assembly, and the dust cover body includes a container with a top opening. The container contains moisture absorbent, and an air-permeable (breathable) film is placed to cover the top opening. When changing the dust cover, no additional steps to remove from and add to the container the moisture absorbent.

Hereinafter, the present invention will be described in more detail with reference to the Examples and Comparative Examples. However, the following Examples and Comparative Examples are only an example for describing the present invention in detail, and do not limit the present invention in any way.

<Moisture Absorbent Performance Evaluation>

1. Moisture Absorption Rate

The moisture absorption rate was measured after exposing a specimen to a temperature of 50±2° C. and a relative humidity of 95±5% for seven days using a thermohygrostat, and calculated by the following Equation 1:

$$\text{Moisture absorption rate} = \frac{\text{Final weight after a certain period of exposure} - \text{Initial weight}}{\text{Initial weight}} \times 100 \quad \text{[Equation 1]}$$

2. Release Rate

The release rate was measured as a release rate when a specimen is exposed to a constant temperature and humidity condition of 23° C. and a relative humidity of 50% for 48 hours and then allowing the specimen to stand in an oven at 70° C. for 2 hours and calculated by the following Equation 2:

$$\text{Release rate} = \frac{\text{Initial weight} - \text{Weight after drying}}{\text{Initial weight}} \times 100 \quad \text{[Equation 2]}$$

3. Moisture Absorption Speed

The moisture absorption speed was measured after exposing a specimen to a temperature of 50±2° C. and a relative humidity of 95±5% for 2 hours using a thermohygrostat, and calculated by the following Equation 3:

$$\text{Moisture absorption speed (\%/2 hr)} = \frac{(\text{Final weight after exposure for 2 hours} - \text{Initial weight})}{\text{Initial weight}} \times 100 \quad \text{[Equation 3]}$$

4. Control Period of Humidity Inside Lamp

The dust cover including the moisture absorbent was combined with one end inside a lamp assembly, and the lamp assembly was allowed to stand under a condition of 40° C. and 90% R.H. At this time, a wireless temperature and humidity meter was mounted inside the lamp and internal humidity was measured. Thereafter, a period when the internal humidity became 60% was measured, which is shown in Table 3.

<Preparation Example of Moisture Absorbent>

45 wt % of magnesium chloride (Aldrich, purity of 94%) as the hygroscopic material, 30 wt % of magnesium oxide (KONOSHIMA CHEMICAL, STARMAG 50, particle size of 30 μm) as the curable inorganic substance, 15 wt % of $NaH_2PO_4$ (Aldrich, purity of 99%) used as the alkali metal phosphate salt, and 10 wt % of a polyethylene wax (SFC, LH1200, softening point of 109±3° C.) were uniformly mixed using a mixer to prepare 25 g of a moisture absorbent.

EXAMPLE 1

25 g of the thus-prepared moisture absorbent was introduced to the moisture absorbent storage unit 230 of FIG. 2, and an opening unit of the moisture absorbent storage unit 230 was heat-fused with the air-permeable film 220 to be bonded.

As the air-permeable film, a Tyvek film (Dupont, 1056D) was used.

The material of the air-permeable film is shown in Table 1.

The moisture absorption rate, the release rate, and the moisture absorption speed of the moisture absorbent storage unit 230 were measured and are shown in Table 2.

The moisture absorbent storage unit 230 was combined with the housing space 110, and then the dust cover 1000 having excellent moisture control performance was combined with a TM lamp and a control period of humidity inside the lamp was measured, which is shown in Table 3.

EXAMPLE 2

The process was performed in the same manner as in Example 1, except using a coated Tyvek-1 instead of the Tyvek film as the air-permeable film.

The coated Tyvek-1 was prepared by applying a hot-melt coating solution (25 wt % of an acryl latex pressure-sensitive adhesive (transparent cluster), 8 wt % of an acryl latex (resin), 8 wt % of a hot-melt adhesive including an ethylene-vinylacetate resin), 55 wt % of toluene, and 4 wt % of a curing agent) on a Tyvek film (Dupont, 1056D) and then drying the film. At this time, a basis weight was 64 g/m$^2$ and a thickness was 150 μm.

The material of the air-permeable film is shown in Table 1.

The moisture absorption rate, the release rate, and the moisture absorption speed of the moisture absorbent storage unit 230 were measured and are shown in Table 2.

The moisture absorbent storage unit 230 was combined with the housing space 110, and then the dust cover 1000 having excellent moisture control performance was combined with a TM lamp and a control period of humidity inside the lamp was measured, which is shown in Table 3.

EXAMPLE 3

The process was performed in the same manner as in Example 1, except using a coated Tyvek-2 instead of the Tyvek film as the air-permeable film.

The coated Tyvek-2 was prepared by applying a hot-melt coating solution (25 wt % of an acryl latex pressure-sensitive adhesive (transparent cluster), 8 wt % of an acryl latex (resin), 8 wt % of a hot-melt adhesive including an ethylene-vinylacetate resin), 55 wt % of toluene, and 4 wt % of a curing agent) on a Tyvek film (Dupont, 1056D) and then drying the film. At this time, a basis weight was 66 g/m$^2$ and a thickness was 175 μm.

The material of the air-permeable film is shown in Table 1.

The moisture absorption rate, the release rate, and the moisture absorption speed of the moisture absorbent storage unit 230 were measured and are shown in Table 2.

The moisture absorbent storage unit 230 was combined with the housing space 110, and then the dust cover 1000 having excellent moisture control performance was combined with a TM lamp and a control period of humidity inside the lamp was measured, which is shown in Table 3.

EXAMPLE 4

The process was performed in the same manner as in Example 1, except using a laminated film (35 μm/9 holes) instead of the Tyvek film as the air-permeable film.

As the laminated film, a film laminated by layering a linear low density polyethylene film (LLDPE, Hanwha Chemical Corporation, 3324) as a perforated film on a Tyvek film (Dupont, 1056D) and then heating to 120° C., was used. As the perforated film, a film having the number of perforations of 9/cm$^2$ and an average perforation diameter of 1.0 mm was used. In addition, the average thickness of the perforated film was 35 μm.

The material of the air-permeable film is shown in Table 1.

The moisture absorption rate, the release rate, and the moisture absorption speed of the moisture absorbent storage unit 230 were measured and are shown in Table 2.

The moisture absorbent storage unit 230 was combined with the housing space 110, and then the dust cover 1000 having excellent moisture control performance was combined with a TM lamp and a control period of humidity inside the lamp was measured, which is shown in Table 3.

EXAMPLE 5

The process was performed in the same manner as in Example 1, except using a laminated film (35 μm/15 holes) instead of the Tyvek film as a second air-permeable film.

As the laminated film, a film laminated by layering a linear low density polyethylene film (LLDPE, Hanwha Chemical Corporation, 3324) as a perforated film on a Tyvek film (Dupont, 1056D) and then heating to 120° C., was used. As the perforated film, a film having the number of perforations of 15/cm$^2$ and an average perforation diameter of 1.0 mm was used. In addition, the average thickness of the perforated film was 35 μm.

The material of the air-permeable film is shown in Table 1.

The moisture absorption rate, the release rate, and the moisture absorption speed of the moisture absorbent storage unit 230 were measured and are shown in Table 2.

The moisture absorbent storage unit 230 was combined with the housing space 110, and then the dust cover 1000 having excellent moisture control performance was combined with a TM lamp and a control period of humidity inside the lamp was measured, which is shown in Table 3.

COMPARATIVE EXAMPLE 1

The moisture absorbent was introduced to air-permeable packaging having a length of 100 mm and a width of 100 mm, and was processed at a temperature of 120° C. using a heat sealing machine to prepare a moisture absorbent pouch. The air-permeable packaging is packaging having a double membrane structure (synthetic latex/Tyvek: coating layer thickness of 5 μm) formed by applying a hot-melt coating solution [25 wt % of an acryl latex pressure-sensitive adhesive (transparent cluster), 8 wt % of an acryl latex (resin), 8 wt % of a hot-melt adhesive including EVA, 55 wt % of toluene, and 4 wt % of a curing agent] on a Tyvek film and drying the film. The basis weight of the air-permeable packaging was 64 g/m$^2$ and the thickness thereof was 150 μm.

The material of the air-permeable packaging is shown in Table 1.

The moisture absorbent pouch was introduced inside the housing space of the dust cover, and fixed with a bracket.

The dust cover fixed with the bracket was combined with a TM lamp and a control period of humidity inside a lamp was measured, which is shown in Table 1.

TABLE 1

|  | Example 1 | Example 2 | Example 3 | Example 4 | Example 5 | Comparative Example 1 |
|---|---|---|---|---|---|---|
| Air-permeable film | Tyvek film | Coated Tyvek-1 | Coated Tyvek-2 | Laminated film (35 μm/9 holes) | Laminated film (35 μm/15 holes) | Coated Tyvek-1 |

TABLE 2

|  | Example 1 | Example 2 | Example 3 | Example 4 | Example 5 | Comparative Example 1 |
|---|---|---|---|---|---|---|
| Moisture absorption rate (%) | 150 | 154 | 155 | 153 | 152 | 120 |
| Release rate (%) | 2 | 1.6 | 1.7 | 1.5 | 1.6 | 4.9 |
| Moisture absorption speed (%/2 hr) | 5 | 5.5 | 5.4 | 5.2 | 5.2 | 3.3 |

TABLE 3

|  | Example 1 | Example 2 | Example 3 | Example 4 | Example 5 | Comparative Example 1 |
|---|---|---|---|---|---|---|
| Control period of humidity inside lamp (days) | 52 | 61 | 76 | 63 | 60 | 30 |

It was confirmed that the Examples had an effect of having higher moisture absorption rates and lower release rates than those of Comparative Example 1.

It was also confirmed that the humidities inside the lamp of the Examples was also lower than that of Comparative Example 1.

It was confirmed that due to the effects, the Examples may prevent dew condensation inside a lamp more effectively than Comparative Example 1.

It was found that even in the case where the moisture absorbent has the same constitution and content, performance may be varied depending on the method of including the moisture absorbent.

The dust cover having excellent moisture control performance of the present invention includes the moisture absorbent content within a space, which is sealed by the air-permeable film, whereby an additional component is not needed, and a time and costs for mounting the moisture absorbent in a pouch form may be saved.

In addition, an automation process may be applied to dramatically improve productivity.

In addition, the dust cover of the present invention is more effective than that using the conventional moisture absorbent in a pouch form, in terms of maintaining moisture absorption performance for a long period of time, and implementing moisture absorption performance optimized for a lamp to maintain low humidity inside the lamp.

In addition, the dust cover of the present invention has excellent durability and uniform performance, and it is easy to secure quality.

Hereinabove, although the present invention has been described by specific matters, limited exemplary embodiments, and drawings, they have been provided only for assisting the entire understanding of the present invention, and the present invention is not limited to the exemplary embodiments, and various modifications and changes may be made by those skilled in the art to which the present invention pertains from the description.

Therefore, the spirit of the present invention should not be limited to the above-described exemplary embodiments, and the following claims as well as all modified equally or equivalently to the claims are intended to fall within the scope and spirit of the invention.

What is claimed is:

1. A dust cover, the dust cover comprising:
   a housing having a housing space formed inside and one open end; and
   a moisture absorption unit including an air-permeable film and a moisture absorbent which is sealed with the air-permeable film and provided in the housing space,
   wherein the moisture absorption unit has a moisture absorption rate of 150% or more and a release rate of 2% or less, and
   wherein the moisture absorbent includes:
   (A) 10 to 70 wt % of one or more hygroscopic materials selected from the group consisting of magnesium chloride, calcium chloride, and sodium carbonate;
   (B) 10 to 50 wt % of a curable inorganic substance comprising at least one or more selected from the group consisting of magnesium oxide and calcium oxide;
   (C) 5 wt % to 50 wt % of a polymer wax; and
   (D) an alkali metal phosphate salt included at 1 to 30 parts by weight, based on 100 parts by weight of the moisture absorbent.

2. The dust cover of claim 1, wherein the air-permeable film seals the one open end of the housing.

3. The dust cover of claim 1, wherein the moisture absorption unit further includes:
   a moisture absorbent storage unit having one open end,
   wherein the moisture absorbent is housed in a moisture absorbent storage unit housing space of the moisture absorbent storage unit, and the air-permeable film seals the one open end of the moisture absorbent storage unit.

4. The dust cover of claim 1, wherein the moisture absorbent is included at 80 vol % or less of the housing space.

5. The dust cover of claim 1, wherein the moisture absorption unit has a moisture absorption speed of 2 to 6%/2 hours or more.

6. The dust cover of claim 1, wherein the moisture absorbent includes: (A) 45 to 70 wt % of one or more hygroscopic materials selected from the group consisting of magnesium chloride, calcium chloride, and sodium carbonate.

7. The dust cover of claim 1, wherein the alkali metal phosphate salt comprises at least one selected from the group consisting of monosodium phosphate and trisodium phosphate.

8. A car lamp comprising a dust cover, the dust cover comprising:
- a housing having a housing space formed inside and one open end; and
- a moisture absorption unit including an air-permeable film and a moisture absorbent which is sealed with the air-permeable film and provided in the housing space, wherein the moisture absorption unit has a moisture absorption rate of 150% or more and a release rate of 2% or less, and
wherein the moisture absorbent includes:
  - (A) 10 to 70 wt % of one or more hygroscopic materials selected from the group consisting of magnesium chloride, calcium chloride, and sodium carbonate;
  - (B) 10 to 50 wt % of a curable inorganic substance comprising at least one or more selected from the group consisting of magnesium oxide and calcium oxide;
  - (C) 5 wt % to 50 wt % of a polymer wax; and
  - (D) an alkali metal phosphate salt included at 1 to 30 parts by weight, based on 100 parts by weight of the moisture absorbent.

9. The car lamp of claim 8, wherein a humidity inside the car lamp is maintained at 60% or less for 45 days or more under a condition of being left at 40° C. and 90% relative humidity.

* * * * *